(12) United States Patent
Airas

(10) Patent No.: US 8,490,027 B2
(45) Date of Patent: Jul. 16, 2013

(54) USER CONTROL

(75) Inventor: Matti Airas, Espoo (FI)

(73) Assignee: Nokia Corporation, Espoo (FI)

( * ) Notice: Subject to any disclaimer, the term of this patent is extended or adjusted under 35 U.S.C. 154(b) by 336 days.

(21) Appl. No.: 12/761,875

(22) Filed: Apr. 16, 2010

(65) Prior Publication Data

US 2011/0258586 A1    Oct. 20, 2011

(51) Int. Cl.
    *G06F 3/033*    (2006.01)
(52) U.S. Cl.
    USPC .......................... 715/863; 715/833
(58) Field of Classification Search
    USPC ................... 715/786, 833, 863, 784, 787
    See application file for complete search history.

(56) References Cited

U.S. PATENT DOCUMENTS

| | | | |
|---|---|---|---|
| 7,394,453 B2* | 7/2008 | Woolley et al. | 345/157 |
| 2006/0123357 A1* | 6/2006 | Okamura | 715/786 |
| 2006/0136838 A1* | 6/2006 | Nurmi | 715/786 |
| 2009/0177995 A1* | 7/2009 | Gould | 715/786 |
| 2010/0088654 A1* | 4/2010 | Henhoeffer | 715/863 |
| 2010/0107066 A1* | 4/2010 | Hiitola et al. | 715/702 |
| 2010/0153879 A1* | 6/2010 | Rimas-Ribikauskas et al. | 715/810 |
| 2010/0231537 A1* | 9/2010 | Pisula et al. | 345/173 |
| 2011/0202871 A1* | 8/2011 | Bair et al. | 715/786 |
| 2011/0258547 A1* | 10/2011 | Symons et al. | 715/723 |

OTHER PUBLICATIONS

Eventide® Precision Time Align Precision Time Delay, EQ45/EQ65 User Guides, Eventide Inc., (2006), 10 pages.

* cited by examiner

*Primary Examiner* — Omar Abdul-Ali
(74) *Attorney, Agent, or Firm* — Alston & Bird LLP

(57) ABSTRACT

An apparatus including: at least one processor; and at least one memory including computer program code, the at least one memory and the computer program code configured to, with the at least one processor, cause the apparatus at least to: resolve a user input trace into a first displacement in a first direction and a second displacement in a second direction, orthogonal to the first direction; and control a position within a range in dependence upon both the first displacement and the second displacement.

20 Claims, 5 Drawing Sheets

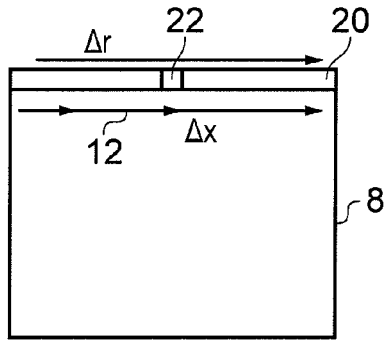 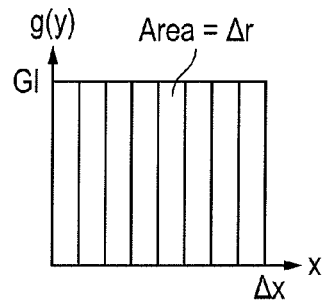 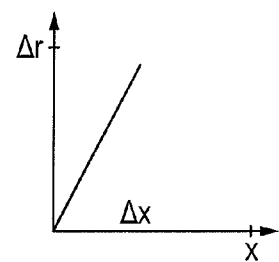
FIG. 3A  FIG. 3B  FIG. 3C
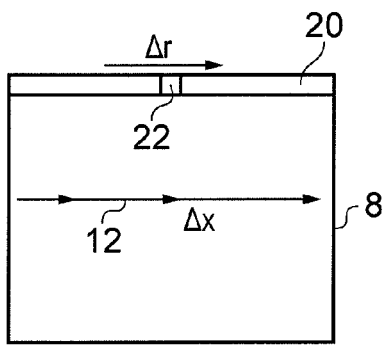 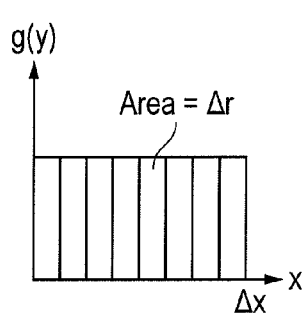 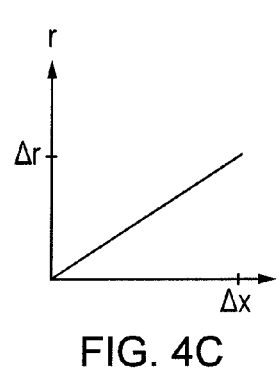
FIG. 4A  FIG. 4B  FIG. 4C
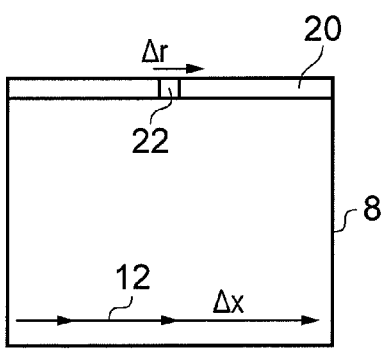 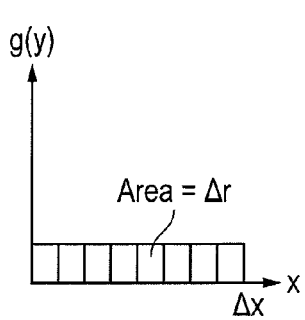 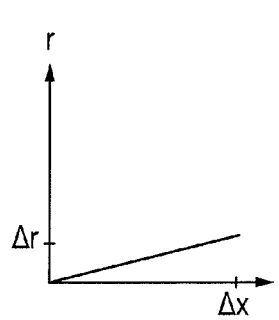
FIG. 5A  FIG. 5B  FIG. 5C

US 8,490,027 B2

USER CONTROL

TECHNOLOGICAL FIELD

Embodiments of the present invention relate to user control of an apparatus.

BACKGROUND

User interfaces or man machine interfaces are commonly provided at an apparatus to enable a user to control the apparatus. However, the interfaces are not always optimal.

BRIEF SUMMARY

According to various, but not necessarily all, embodiments of the invention there is provided an apparatus comprising: at least one processor; and at least one memory including computer program code, the at least one memory and the computer program code configured to, with the at least one processor, cause the apparatus at least to: resolve a user input trace into a first displacement in a first direction and a second displacement in a second direction, orthogonal to the first direction; and control a position within a range in dependence upon both the first displacement and the second displacement.

According to various, but not necessarily all, embodiments of the invention there is provided a method comprising: resolving a user input trace into a first displacement in a first direction and a second displacement in a second direction, orthogonal to the first direction; and controlling a position within a range in dependence upon both the first displacement and the second displacement.

According to various, but not necessarily all, embodiments of the invention there is provided an apparatus comprising: means for resolving a user input trace into a first displacement in a first direction and a second displacement in a second direction, orthogonal to the first direction; and means for controlling a position within a range in dependence upon both the first displacement and the second displacement.

BRIEF DESCRIPTION OF THE DRAWINGS

For a better understanding of various examples of embodiments of the present invention reference will now be made by way of example only to the accompanying drawings in which:

FIGS. 3A, 3B and 3C schematically illustrate a first horizontal trace, the gearing for the trace and how a position within a range varies with the trace;

FIGS. 4A, 4B and 4C schematically illustrate a second horizontal trace, the gearing for the trace and how a position within a range varies with the trace;

FIGS. 5A, 5B and 5C schematically illustrate a third horizontal trace, the gearing for the trace and how a position within a range varies with the trace;

DETAILED DESCRIPTION

Figure 1:
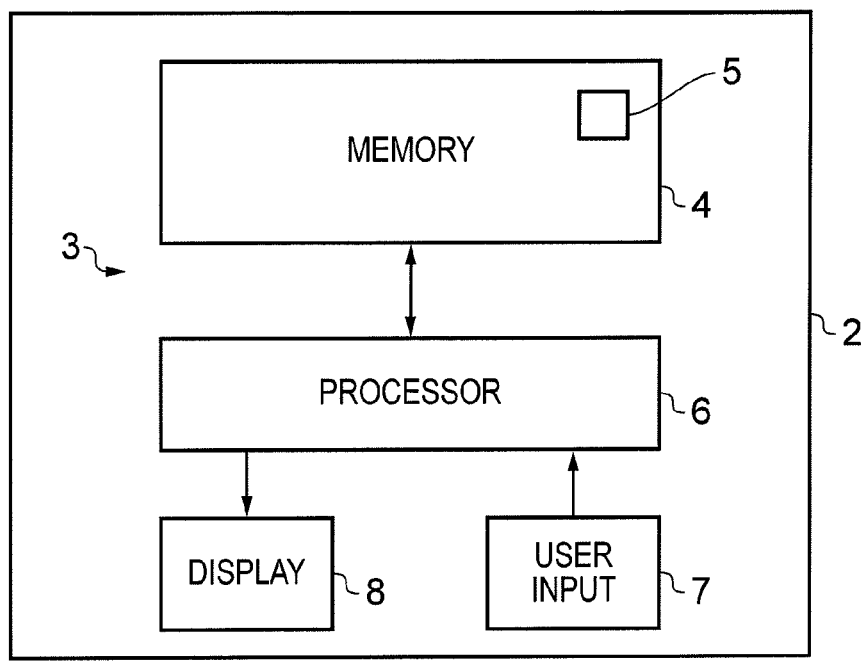
FIG. 1 schematically illustrates an example of an apparatus.
Figure 1:
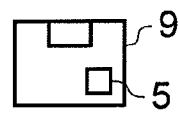

The Figures illustrate an apparatus 2 comprising: at least one processor 6; and at least one memory 4 including computer program code 5, the at least one memory 4 and the computer program code 5 configured to, with the at least one processor 6, cause the apparatus 2 at least to: resolve a user input trace 12 into a first displacement 14 in a first direction 10 and a second displacement 13 in a second direction 11, orthogonal to the first direction 10; and control a position r within a range R in dependence upon both the first displacement 14 and the second displacement 13.

FIG. 1 schematically illustrates an example of an apparatus 2 comprising a controller 3, a display 8 and a user input device 7. The controller 3 is configured to receive user input commands from the user input device 7 and is configured to provide output commands to the display 8.

Implementation of the controller can be in hardware alone (a circuit, a processor, etc.), have certain aspects in software including firmware alone or can be a combination of hardware and software (including firmware).

The controller 3 may be implemented using instructions that enable hardware functionality, for example, by using executable computer program instructions in a general-purpose or special-purpose processor that may be stored on a computer readable storage medium (disk, memory etc) to be executed by such a processor.

In the illustrated example, the controller 3 is provided by a processor 6 and memory 4. Although a single processor 6 and a single memory are illustrated in other implementations there may be multiple processors and/or multiple memories.

The processor 6 is configured to read from and write to the memory 4. The processor 6 may also comprise an output interface via which data and/or commands are output by the processor 6 and an input interface via which data and/or commands are input to the processor 6.

The memory 4 stores a computer program 5 comprising computer program instructions. The instructions control the operation of the apparatus 2 when loaded into the processor 6. The computer program instructions 5 provide the logic and routines that enables the apparatus 2 to perform the methods described below and illustrated in FIG. 9. The processor 6 by reading the memory 4 is able to load and execute the computer program 5.

The computer program may arrive at the apparatus 2 via any suitable delivery mechanism 9. The delivery mechanism 9 may be, for example, a computer-readable storage medium, a computer program product, a memory device, a record medium, an article of manufacture that tangibly embodies the computer program 5. The delivery mechanism may be a signal configured to reliably transfer the computer program 5. The apparatus 2 may propagate or transmit the computer program 5 as a computer data signal.

Although the memory 4 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry and devices. References to computer program, instructions, code etc. should be understood to encompass software for a programmable processor or firmware such as, for example, the programmable content of a hardware device whether instructions for a processor, or configuration settings for a fixed-function device, gate array or programmable logic device, etc.

As used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

The display 8 may be a touch-sensitive display 8 in which case the display 8 and the user input device are integrated into a single device.

Figure 2:
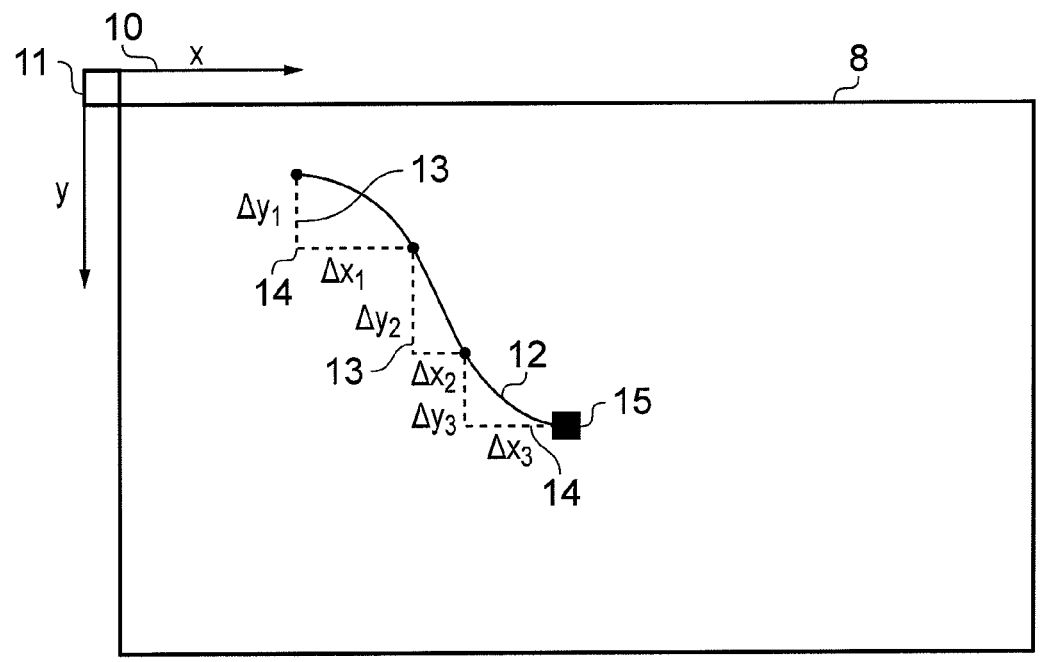
FIG. 2 schematically illustrates a user input trace made on a display of the apparatus.

FIG. 2 schematically illustrates a user input trace 12 made on the display 8 using the user input device 7. The trace 12 may, for example, be formed by dragging a widget 15 using a cursor control device such as a mouse or track-ball. Alternatively, the trace 12 may, for example, be formed by dragging a user's digit or stylus over the surface of a touch-sensitive display 8.

The area of the display 8 is spanned by two orthogonal vectors x and y. The vector x runs in a first direction 10, which in this example is parallel to a top edge of a rectangular display 8. The vector y runs in a second direction 11, which in this example is parallel to a side edge of a rectangular display 8. The first and second directions are orthogonal.

The trace 12 may be defined using a vector (x(t), y(t)), where x(t) represents the displacement of the trace 12 in the first direction 10 at time t and y(t) represents the displacement of the trace 12 in the second direction 11 at time t.

The user input trace 12 at any time t may be resolved by the controller 3 into a first displacement 14 in a first direction 10 and a second displacement 13 in a second direction 11, orthogonal to the first direction 10. The trace 12 may be resolvable into the first displacement 14 and the second displacement 13 by the controller 3 over substantially all of the display 8.

In the figure the trace is sampled at times t0, t1, t2, t3 with sample interval $\Delta t$. The first and second displacements at time t0 may be defined as (x0, y0). The first and second displacements (x1, y1) at time t1 may be defined as differential displacements ($\Delta x1$, $\Delta y1$) relative to (x0, y0). The first and second displacements (x2, y2) at time t2 may be defined as differential displacements ($\Delta x2$, $\Delta y2$) relative to (x1, y1). The first and second displacements (x3, y3) at time t3 may be defined as differential displacements ($\Delta x3$, $\Delta y3$) relative to (x2, y2) etc.

The change in the position r with a range R may be expressed as:

$$\Delta r = g(y) * \Delta x$$

Where g(y) is the gearing function which typically has a value that is large for small y and which decreases for larger values of y.

Any suitable algebraic function or look-up table may be used to define the gearing g(y). Examples of functions that may be used include: linear functions such as:

$$g = a - b*y, \text{ where a and b are constants; and}$$

non-linear functions such as:

$$g = a - b*\log(y), \text{ where a and b are constants}$$

$$g = b/(y-a), \text{ where a and b are constants}$$

$$g = a*(y^b) + c, \text{ where a, b, c are constants}$$

$$g = a*y^2 + b*y + c, \text{ where a, b, c are constants}$$

Displacement $\Delta r$ of the position within the range R over a sample time $\Delta t$ is proportional to the first displacement $\Delta x$ and a gearing g(y) between the displacement $\Delta r$ of the position within the range and the first displacement $\Delta x$ is dependent upon the second displacement y.

FIGS. 3A, 3B and 3C schematically illustrate how a position r within a range R varies in dependence upon the first displacement x when the second displacement 13 has a first fixed value y1.

The change in the position r within a range R may be expressed as:

$$\Delta r = g(y1) * \Delta x = G1 * \Delta x$$

Where G1 is a gearing constant.

In FIG. 3A, a widget 22 is illustrated in a scroll bar 20. The position r of the widget within the scrollbar of length R indicates the position within the range. In FIG. 3A a trace 12 across the width of the display 8 (second displacement is constant at y1) will move the widget 22 a distance $\Delta r$ across the width R of the scrollbar 20.

The gearing value G1 is large and constant for all values of x as illustrated in FIG. 3B.

As the gearing value G1 is large the position r within the range changes rapidly with an increase in the first displacement x of the trace 12 as illustrated in FIG. 3C.

FIGS. 4A, 4B and 4C schematically illustrate how a position r within a range R varies in dependence upon the first displacement x when the second displacement 13 has a first fixed value y2 that is larger than y1.

The change in the position r with a range may be expressed as:

$$\Delta r = g(y2) * \Delta x = G2 * \Delta x$$

Where G2 is a gearing constant that is less than G1.

In FIG. 4A, a widget 22 is illustrated in a scroll bar 20. The position r of the widget within the scrollbar of length R indicates the position within the range. In FIG. 4A a trace 12 across the width of the display 8 (second displacement is constant at y2) will move the widget 22 a moderate distance Δr across the width R of the scrollbar 20.

The gearing value G2 is mid-valued and constant for all values of x as illustrated in FIG. 4B.

As the gearing value G2 is mid-valued the position r within the range changes moderately with an increase in the first displacement x of the trace 12 as illustrated in FIG. 4C.

FIGS. 5A, 5B and 5C schematically illustrate how a position r within a range R varies in dependence upon the first displacement x when the second displacement 13 has a first fixed value y3 that is greater than y2.

The change in the position r with a range R may be expressed as:

$$\Delta r = g(y3)*\Delta x = G3*\Delta x$$

Where G3 is a gearing constant that is less than G2.

In FIG. 5A, a widget 22 is illustrated in a scroll bar 20. The position r of the widget within the scrollbar of length R indicates the position within the range.

In FIG. 5A a trace 12 across the width of the display 8 (the second displacement is constant at y3) will move the widget 22 a small distance Δr across the width R of the scrollbar 20.

The gearing value G3 is small and constant for all values of x as illustrated in FIG. 5B.

As the gearing value G3 is small the position r within the range changes slowly with an increase in the first displacement x of the trace 12 as illustrated in FIG. 5C.

Figure 6A:
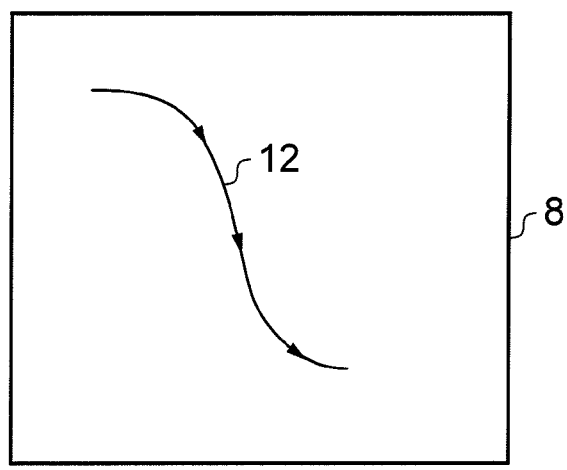
FIG. 6A schematically illustrates a trace 12 that varies in the first direction and simultaneously in the second direction.
Figure 6B:
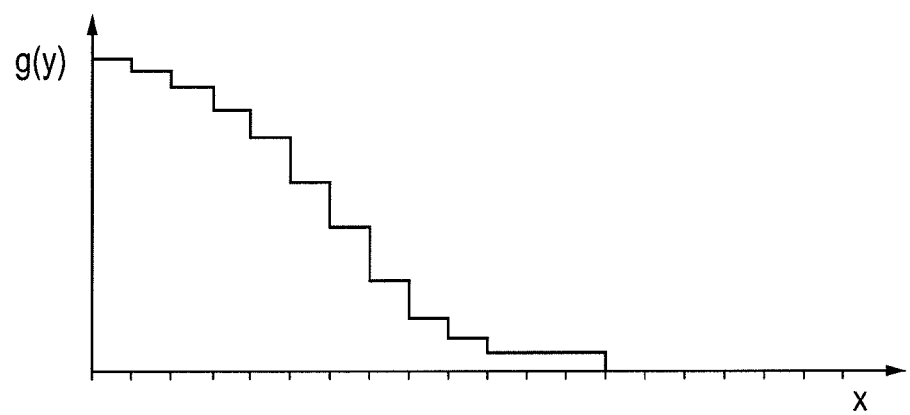
FIG. 6B schematically illustrates the gearing for each sample of the trace.
Figure 6C:
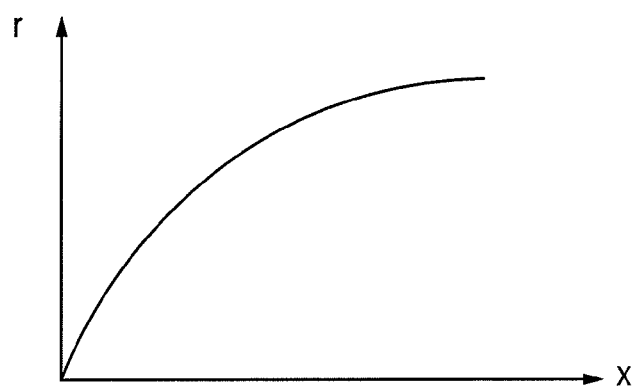
FIG. 6C schematically illustrates how a position within a range varies with the trace.

FIG. 6 schematically illustrates a trace 12 that varies in the first direction x and simultaneously in the second direction y.

The trace 12 is sequentially sampled at, for example, fixed time intervals Δt. Each sample produces a pair of first displacements x and second displacements y for the trace 12.

The change in the position r with a range R may be expressed as:

$$\Delta r = g(y)*\Delta x$$

FIG. 6B schematically illustrates the value of g(y) for each sample and also illustrates the value of x for each sample. It can be seen that as the second displacement y increases over time the gearing g(y) decreases.

The change in the position r within the range is proportional to the area under the graph illustrated in FIG. 6B. This may be determined algebraically using $\Sigma g(y)*\Delta x$.

The position r within the range can be determined in real time and adjusted in real time as the trace 12 is being made by a user.

Figure 7:
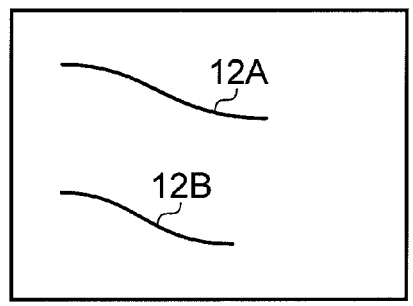
FIG. 7 schematically illustrates a first trace that is then followed by a distinct second trace.

FIG. 7 schematically illustrates a first trace 12A that is then followed by a distinct second trace 12B. For example, a user's digit may be lifted from the touch-sensitive display 8 after completing the first trace 12A and before starting the second trace 12B.

Figure 7A:
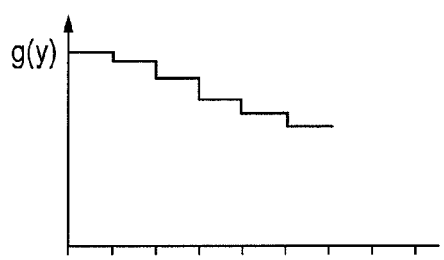
FIG. 7A schematically illustrates the gearing for each sample of the first trace.
Figure 7B:
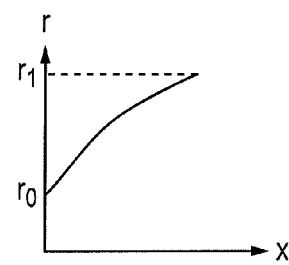
FIG. 7B schematically illustrates how a position within a range varies with the first trace.

The change in the position r within the range as a consequence of the first trace 12A is the area under the graph illustrated in FIG. 7A. This may be determined algebraically using $\Sigma g(y)*\Delta x$. The position r within the range R as a consequence of the first trace 12A is illustrated in FIG. 7B. This may be determined algebraically as $r1 = r0 + g(y)*\Delta x$, where r0 is a starting position within the range R.

Figure 7C:
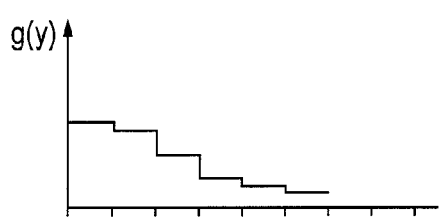
FIG. 7C schematically illustrates the gearing for each sample of the second trace.

The change in the position r within the range as a consequence of the second trace 12B is the area under the graph illustrated in FIG. 7C. This may be determined algebraically using $\Sigma g(y)*\Delta x$.

Figure 7D:
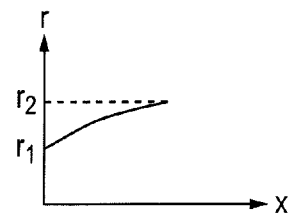
FIG. 7D schematically illustrates how a position within a range varies with the second trace.

The position r within the range R as a consequence of the second trace 12B is illustrated in FIG. 7D. This may be determined algebraically as $r2 = r1 + \Sigma g(y)*\Delta x$.

The displacement value Δx may in one embodiment be determined as a relative position change with a moving origin e.g. $\Delta x(t) = x(t) - x(t-\Delta t)$ or in another embodiment be determined as an absolute position change with a fixed origin $\Delta x = x(t) - x_0$ where $x_0$ is a constant. The former may be used when the trace is a multi-sample trace, where the displacement between samples controls the position r. The latter may be used when the trace is a single-sample trace e.g. a tap, where the location of the tap from a fixed origin controls the position r.

In some embodiments, it may be possible to set an initial position r within the range by using a tap at position (x1, y1). This would then be converted to the position r according to $r = g1(y1)*x1$ or some other function of x1 and y1. Subsequently, changes to the position r within the range could be determined using $\Delta r = g2(y)*\Delta x$, where Δx is a relative position change between samples.

Figure 8A:
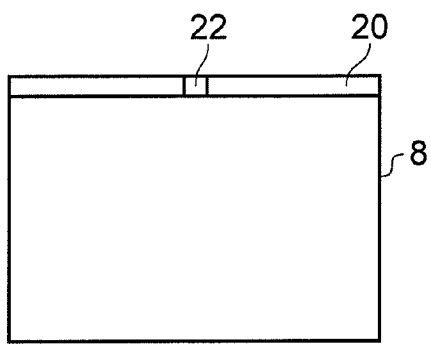
FIGS. 8A and 8B schematically illustrate an embodiment in which functionality of the controller is enabled and scaling markings are displayed.
Figure 8B:
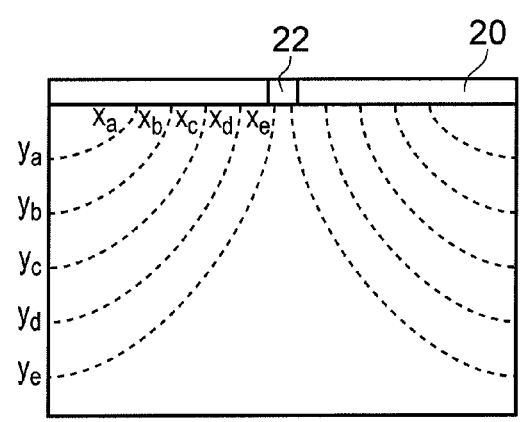

FIGS. 8A and 8B schematically illustrate an embodiment of the display 8. In this embodiment, the controller 3 is not initially capable of resolving a user input trace into a first displacement in a first direction and a second displacement in a second direction, orthogonal to the first direction; and controlling a position within a range in dependence upon both the first displacement and the second displacement.

However, when the user double selects/taps the widget 22 in the scrollbar 20, the controller 3 is enabled to resolve a user input trace into a first displacement in a first direction and a second displacement in a second direction, orthogonal to the first direction; and control a position within a range in dependence upon both the first displacement and the second displacement.

In other implementations different forms of enablement may be provided. For example a user input device such as a key or touchpad may be used to provide a user input command for this purpose. In other implementations enablement may be permanent or a default condition that is changed, for example, under user control.

The controller 3, after enablement, controls the display 8 in this embodiment to present scaling markings on the display 8.

In this example, the markings are symmetrical pairs. A left marking of a pair extends in a curve from $(0, y_i)$ to $(x_i, 0)$. A right marking of a pair extends in a curve from $(R, y_i)$ to $(R-x_i, 0)$. A pair of markings indicates that at a second displacement $y_i$ the position r can be moved within the range R by $R - 2 x_i$ by performing a trace 12 across the whole width of the display 12.

In an extension of this embodiment, a user can set the position r within the range R at the beginning of the range by tapping the upper-left corner of the widget 22. The user may be able to advance the position r a predetermined amount Δr by tapping the lower right corner of the widget 22.

Figure 9:
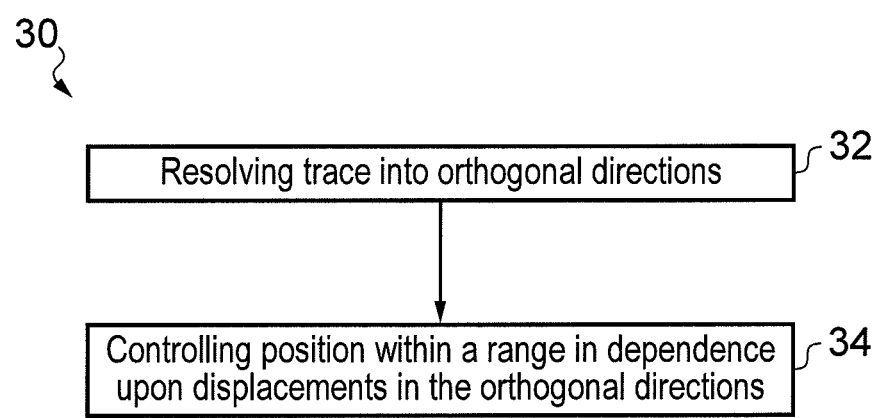
FIG. 9 schematically illustrates a method.

In a further extension of this embodiment, the user may tap any point along a scaling marking and the position r within the range R will move to $r = x_i$ if the marking is a left marking and to $r = R - x_i$ if the marking is a right marking. FIG. 9 schematically illustrates a method 40 which may be performed by controller 3.

At block 32 a user input trace 12 is resolved into a first displacement x in a first direction 10 and a second displacement y in a second direction 11, orthogonal to the first direction 10.

At block 34 a position within a range is determined in dependence upon both the first displacement x and the second displacement y.

The position within the range, may be a marker position within a range of data.

For example the marker position may identify a sub-list of items within a list of items. Changing the marker position changes the sub-list of items displayed. This may be advantageous when scrolling through long lists such as telephone directories or computer code listings.

For example, the marker position may identify current media output within a media recording. Changing the marker position changes the current media output. Being able to carefully control the marker position allows a user to navigate to a desired position within a song, video, film, etc and resume playing from that position.

The apparatus 2 may be a hand-portable electronic device that is sized to fit into a jacket pocket. The apparatus may be a media device such as a personal music player or a personal video player or a personal electronic book reader. The apparatus may be a mobile cellular telephone or a personal digital assistant or similar.

The user may be able to zoom-in on content at a desired position with a desired precision. The precision may be dynamically controlled by the real-time displacement of the trace 12 in the second direction y. The zoom may be dynamically determined by the real-time displacement of the trace 12 in the first direction x.

The blocks illustrated in the FIG. 9 may represent operations of a method and/or sections of code in the computer program 5. The illustration of a particular order to the blocks does not necessarily imply that there is a required or preferred order for the blocks and the order and arrangement of the block may be varied. Furthermore, it may be possible for some operations to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
   at least one processor; and
   at least one memory including computer program code,
   the at least one memory and the computer program code configured to, with the at least one processor, cause the apparatus at least to:
   resolve a user input tap into a first displacement with respect to a fixed origin in a first direction and a second displacement with respect to the fixed origin in a second direction, orthogonal to the first direction; and
   control a position within a range in dependence upon both the first displacement and the second displacement.

2. An apparatus as claimed in claim 1, wherein a displacement of the position within the range is proportional to the first displacement.

3. An apparatus as claimed in claim 1, wherein a gearing between the displacement of the position within the range and the first displacement is dependent upon the second displacement.

4. An apparatus as claimed in claim 1, wherein the at least one memory and the computer program code are configured to, with the at least one processor, cause the apparatus at least to:
   resolve a further user input tap to determine a further pair of first and second displacements; and
   determine a displacement of the position within the range for each pair of first and second displacements as they are determined.

5. An apparatus as claimed in claim 1, wherein the position within the range is dynamically adjusted following the tap.

6. An apparatus as claimed in claim 1, further comprising a display, wherein the tap is a tap on the display made by a user input device.

7. An apparatus as claimed in claim 6, wherein the display is a touch sensitive display.

8. An apparatus as claimed in claim 6 wherein the trace tap involves a movement of a widget within the display.

9. An apparatus as claimed in claim 6, wherein the at least one memory and the computer program code are configured to, with the at least one processor, cause the apparatus at least to present scaling markings on the display.

10. An apparatus as claimed in claim 1, wherein the at least one memory and the computer program code are configured to, with the at least one processor, cause the apparatus at least to enable the controlling of a position within a range in dependence upon both the first displacement and the second displacement in response to a user input command.

11. An apparatus as claimed in claim 1, wherein the position is a marker position within a range of data.

12. An apparatus as claimed in claim 11, wherein the marker position identifies a sub-list within a list.

13. An apparatus as claimed in claim 11, wherein the marker position identifies current media output within a media recording.

14. A hand-portable electronic device comprising the apparatus as claimed in claim 1.

15. A method comprising:
   resolving a user input tap into a first displacement with respect to a fixed origin in a first direction and a second displacement with respect to the fixed origin in a second direction, orthogonal to the first direction; and
   controlling a position within a range in dependence upon both the first displacement and the second displacement.

16. A method as claimed in claim 15, wherein a displacement of the position within the range is proportional to the first displacement.

17. A method as claimed in claim 16, wherein a gearing between the displacement of the position within the range and the first displacement is dependent upon the second displacement.

18. A method as claimed in claim 17, comprising:
   resolving a further tap to determine a further pair of first and second displacements; and
   determining a displacement of the position within the range for each pair of first and second displacements as they are determined.

19. A method as claimed in claim 18, wherein the position within the range is dynamically adjusted following the tap.

20. A non-transitory computer readable storage medium storing computer program instructions that, when performed by at least one processor, causes at least the following to be performed:

resolving a user input tap into a first displacement with respect to a fixed origin in a first direction and a second displacement with respect to the fixed origin in a second direction, orthogonal to the first direction; and controlling a position within a range in dependence upon both the first displacement and the second displacement.

* * * * *

UNITED STATES PATENT AND TRADEMARK OFFICE
CERTIFICATE OF CORRECTION

PATENT NO. : 8,490,027 B2  
APPLICATION NO. : 12/761875  
DATED : July 16, 2013  
INVENTOR(S) : Airas Page 1 of 1

It is certified that error appears in the above-identified patent and that said Letters Patent is hereby corrected as shown below:

In the Claims

Column 8,
Line 25, Claim 8, "the trace tap" should be --the tap--.

Signed and Sealed this
Twelfth Day of November, 2013

Teresa Stanek Rea
*Deputy Director of the United States Patent and Trademark Office*